April 7, 1964 R. H. WALKER 3,128,431

MINIATURE RADIO TRANSMITTER

Filed Dec. 7, 1961 2 Sheets-Sheet 1

INVENTOR.
Robert H. Walker
BY Mueller & Aichele
Atty's.

Inventor:-
Robert H. Walker,
By Mueller & Aichele
Att'ys.

United States Patent Office 3,128,431

Patented Apr. 7, 1964

3,128,431

MINIATURE RADIO TRANSMITTER

Robert H. Walker, Morton Grove, Ill., assignor to Motorola, Inc., Chicago, Ill., a corporation of Illinois Filed Dec. 7, 1961, Ser. No. 157,795
6 Claims. (Cl. 325—111)

This invention relates in general to portable electronic apparatus and in particular to a transistorized, miniature radio transmitting device wherein provisions are included to regulate the signal input to a power amplifier transistor according to variations in ambient temperature.

Miniaturized electronic apparatus have come into prominent usage in recent years, particularly transistorized radio devices of the type for carrying on the person and operated from a self-contained battery power source. The use of transistors makes it possible to provide a compact, lightweight transmitter, both because of the small size of the transistors, and also because of their reduced operating power requirements which permit the use of penlight size batteries for energization of the same. Other miniaturized components such as microphones have been provided which make possible further reduction in the size of portable units.

It is well known that the characteristics of transistors vary with ambient temperature and further that transistor operating current must be held within design limits to prevent damage, particularly in power transistors where the currents involved are of appreciable values. In small units the heat dissipated capacity is not great and a wide range of temperatures may be encountered. Some form of compensation is therefore desirable to stabilize the transistors and control their operating current over a desired ambient temperature range. In the case of power transistors, the internally generated heat by the transistors themselves must also be taken into consideration. The most common solution has been to provide a heat radiating element external to the radio housing and in direct contact with the power transistors so employed to dissipate the heat generated as radiant energy. Such heat radiating elements of a necessity require a "finned" configuration and thereby defeat the intention of compactness. Further, in miniaturized radio devices intended for carrying on the person, these types of heat radiating elements may not be sufficiently exposed to open air to permit optimum dissipation efficiency.

An additional problem in providing a miniature self-contained transmitter is encountered with respect to the associated microphone. Usually the microphone is provided external to the housing and is of the carbon type to obtain the maximum in ruggedness. In prior devices, microphones of the variable reluctance type have not been included because of their susceptibility to shock and vibration in changing their operating characteristics, although the superiority of such microphones is well known in terms of improved sensitivity and reduced distortion characteristics. Nor have such microphones been incorporated as a part of the internal construction.

An object of this invention is to provide a transistorized, miniature radio transmitter device having an all-plastic housing in which the complete circuitry of the radio transmitter is provided as an integral unit including microphone, modulator, frequency multipliers, power amplifier and antenna assembly, and in which the power amplifier transistor is temperature compensated to provide proper operation.

Another object is to provide a heat sink as an integral part of a radio transmitter's internal construction to control the operating current of a power transistor in a final amplifier circuit within predetermined design limits over a desired ambient temperature range.

Another object is to provide a miniaturized radio transmitter device with an internial heat sink to control operating current of a power transistor by a method of thermal feedback according to temperature variations which is not dependent upon exposure to ambient air flow for effective operation.

Still another object is to provide a built-in, miniaturized, variable reluctance microphone for a radio transmitter device with a method of immunizing the same against shock and vibration which might otherwise alter its operating characteristics.

A feature of the present invention is the provision of a battery-powered radio transmitter device having a plastic housing in which the complete electrical circuitry is provided as an integral unit including microphone, a plurality of intermediate stages and their associated components, and a final amplifier circuit mounted in a printed circuit chassis. A heat absorption plate is further provided for internal attachment to the printed circuit chassis and adapted to receive thereon a drive transistor and a power transistor included as part of the final amplifier circuit. The driver transistor includes an output coupled to an input of the power transistor. The heat absorption plate provides a thermal feedback which reduces the output of the driver transistor with increasing temperatures to thereby limit the operating current of the power transistor by the reduction of signal input thereto.

Another feature is the provision of a battery-powered radio transmitter device having electrical circuit components mounted on a printed circuit chassis wherein a low inductance heat sink is included which is adapted for attachment to the printed circuit chassis and receive thereon a driver transistor and a power transistor as part of a final amplifier circuit. Means are included for isolating the drive transistor from electrical contact with the heat sink while permitting efficient transfer of heat energy therebetween which produces a thermal feedback effect for limiting the operating current of the power transistor by a reduction in the output of the driver transistor at high temperatures. The low inductance characteristic of the heat sink insures an efficient ground path for radio frequency signals.

Still another feature is the provision of a built-in, variable reluctance microphone for a miniaturized portable radio transmitting device having electrical circuit components mounted on a printed circuit chassis. Means are included for shock mounting the microphone on the printed circuit chassis consisting of a U-shaped bracket having a base and first and second resilient support arms, each of which is formed by a pliant sleeve of shock absorption material interconnecting a portion of the bracket base and a mounting lug. The bracket base is affixed to the microphone with the mounting lugs being adapted for attachment to the printed circuit chassis.

The invention is illustrated in the accompanying drawings in which.

In practicing the invention, a miniaturized, battery powered, radio transmitting device is provided which includes a plastic housing for receiving electrical circuit components mounted on a printed circuit chassis. A low inductance, L-shaped plate of heat absorption material is provided for mounting on the printed circuit chassis at its base and adapted for receiving a driver transistor and a power transistor in a final amplifier circuit on its vertical side. The output of the driver transistor is coupled to the input of the power transistor. The power transistor is mounted directly on the heat sink with the driver transistor being electrically insulated therefrom by wafers of mica material which permits optimum transfer of heat energy therebetween. The low inductance of the heat sink provides an efficient ground path for radio frequency signals. The heat sink further provides thermal feedback for the power transistor to the driver transistor to reduce the output thereof with increasing temperature, thereby reducing the input to the power transistor to limit its operating current within predetermined design limits over a desired ambient temperature range.

A miniaturized, variable reluctance microphone is also provided for mounting internally on the printed circuit chassis. A U-shaped bracket is included having a base affixed to the microphone and a pair of resilient support arms, each of which is formed by a pliant sleeve of shock absorption material adapted to receive a portion of the bracket base in one end and a mounting lug in the other. The mounting lugs may then be attached to the printed circuit chassis by suitable means. The resilient support arms thereby provide improved protection for the microphone from shock and vibration which might otherwise alter the operating characteristic of the microphone.

Figures 1, 2, 3:
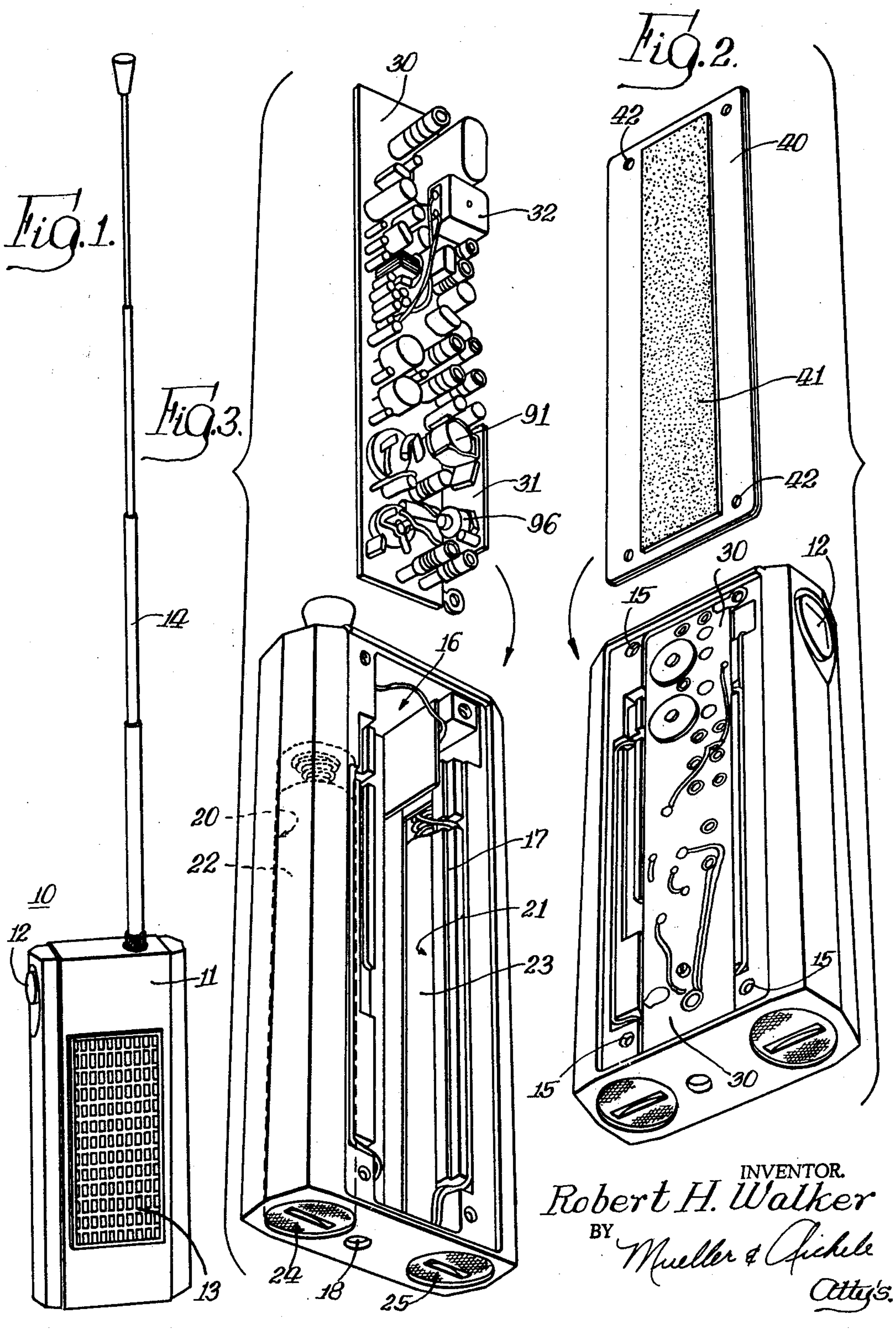
FIG. 1 is a perspective view of the assembled transmitter embodying the present invention.
FIG. 2 is a perspective view of the transmitter with back cover plate removed.
FIG. 3 is a perspective view of the transmitter with printed circuit chassis having electrical circuit components mounted thereon removed from the housing.

Referring to the drawings, FIG. 1 is a perspective view of the pocket radio transmitter 10 as encased in a plastic housing 11 and operated by a push-to-talk switch 12 provided at one side. The transmitter is operable from batteries inserted through openings in the bottom side of the housing. A talk through grill 13 is integrated in the front panel and a telescopic antenna assembly 14 is extendable from the top to the position shown. Transmitter 10 is of a size to be held in one hand with the thumb operating the push-to-talk switch 12 while the operator speaks into grill 13.

In FIG. 2, the back cover plate 40 is removed showing the back side of printed circuit chassis 30 received in housing 11. Cover plate 40 includes a layer of foam plastic 41 attached thereto by mucilage to form a resilient cushion for printed circuit chassis 30 when cover 40 is attached to housing 11 by machine screws inserted through apertures 42 and threaded into bushing 15 integrated on housing 11.

In FIG. 3, printed circuit chassis 30 is removed from housing 11. Electrical circuit components are mounted on printed circuit chassis 30 in the manner illustrated. In assembly, such circuit components extend downward within housing cavity 16 with the sides of chassis 30 being supported on ledge 17 (shown in FIG. 2). Cylindrical battery compartments, identified as 20 and 21, extend along both sides of housing 11 in which batteries 22 and 23 are insertable through openings in the bottom as shown. Battery cap covers 24 and 25 are rotatably received in the openings to secure the batteries within the housing.

The batteries may be of the single-use type, such as mercury cells, or of the rechargeable, such as nickel-cadmium. Provisions are included to recharge the nickel-cadmium, rechargeable type batteries while within the housing. Such provision includes a recessed contact terminal 18 provided on the bottom of housing 11 and connected to one battery pole polarity. The battery cap covers establish electrical continuity to the other battery pole polarity. Connecting an external power source between the contact terminal 18 and the battery cap covers will thereby effect recharging of the nickel-cadmium batteries.

Figures 4, 5, 6, 7:
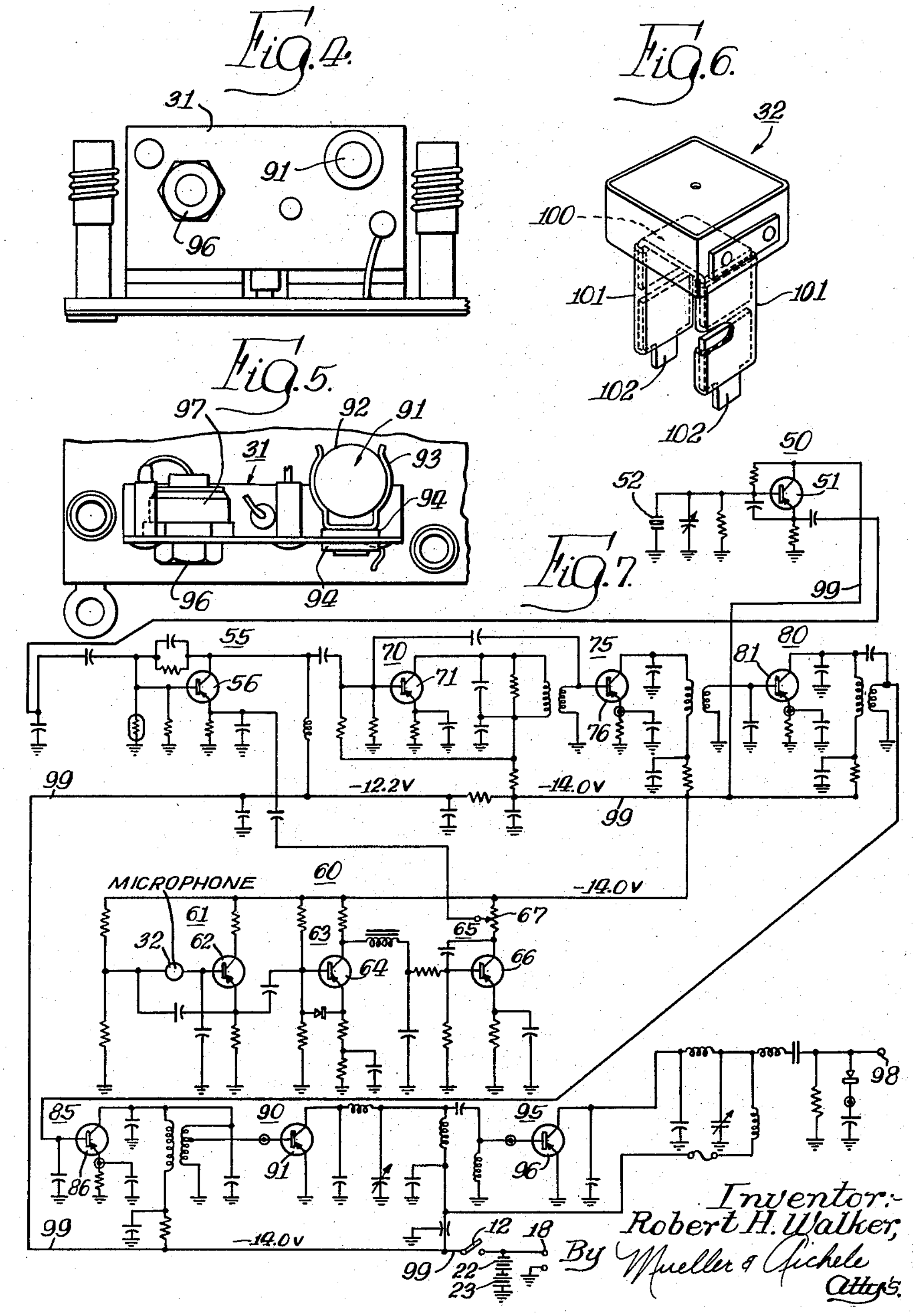
FIG. 4 is a side view of the heat sink having drive and power amplifier transistors mounted thereon.
FIG. 5 is a top view of the heat sink of FIGURE 4.
FIG. 6 is a perspective view of the miniaturized microphone showing the resilient support arms.
FIG. 7 is a schematic of the transmitter electrical circuitry.

FIG. 7 is a schematic of the transmitter electrical circuitry. An oscillator circuit 50 having a transistor 51 is controlled in frequency by crystal 52. The output of oscillator 50, which may be on the order of 5 to 7 megacycles, is fed into a phase modulator stage 55 on the base electrode of an associated transistor 56. Audio modulation, or voice frequency, is coupled to the emitter electrode of transistor 56, from circuit 60. Phase modulator 55 effectively varies the frequency received from oscillator 50 according to the audio modulation at the emitter electrode of transistor 56 received from circuit 60.

Circuit 60 is an audio amplifying and deviation control circuit. The output of microphone 32 is coupled to the input of transistor 62 of pre-amplifier stage 61, the output of which is coupled to amplifier-clipper stage 63, having transistor 64. The output of stage 63 is coupled to stage 65 having transistor 66. Stage 65 functions as an integrating circuit, operating in a well known manner. Potentiometer 67 in the collector circuit of transistor 66 provides an adjustable control to limit the deviation of he audio modulation at a predetermined level of amplitude.

The output of the phase modulator 55 is coupled to a first doubler stage 70 having transistor 71. Stage 70 is coupled to a tripler stage 75 having transistor 76. Stage 75 is coupled to a second doubler stage 80 having transistor 81. Stage 80 is coupled to a third doubler stage 85 having transistor 86. Stages 70 to 85 thereby provide a frequency amplification of twenty-four times the crystal oscillator frequency.

Stage 85 is coupled to amplifier-driver stage 90 having transistor 91. Stage 90 is coupled to final amplifier stage 95 having a power transistor 96. The output of stage 95 is coupled to antenna receptacle 98 having an antenna connected thereto, such as the telescopic antenna assembly 14 of FIG. 1, to transmit the signal so developed.

Operating power is obtained from batteries 22 and 23 connected in series. Operation of the push-to-talk switch 12 applies operating potential to the collector electrode of the respective transistors in stages 50 to 95 via lead 99.

As shown in FIG. 3, a heat sink 31 and a subminiature microphone 32 are mounted on printed circuit chassis 30. A side and top view of heat sink 31 is shown in FIGS. 4 and 5 respectively. As illustrated, heat sink 31 embodies an L-shaped configuration and mounts on printed circuit chassis 30 at its base by machine screws or the like. Heat sink 31 is formed of heat absorption material having a low inductance to provide an efficient ground path for radio frequency signals.

Heat sink 31 is adapted to receive driver transistor 91 and power transistor 96 on its vertical side. Power transistor 96 may be of the type having an electrical insulator 97 around its circumference such that it may be mounted directly on heat sink 31. Transistor 91 may be of the type having its outer housing 92 electrically connected to the collector electrode. A bracket assembly 93 affixed to heat sink 31 is provided for retaining transistor 91 in suitably contoured arms. Bracket 93 is electrically insulated from heat sink 31 by wafers of mica material 94. The mica wafers 94, however, readily permit transfer of heat energy between bracket 93 in contact with housing 92 of transistor 91 and the heat sink 31.

Since power transistor 96 generates substantially more heat than driver transistor 91, thermal feedback is effected from transistor 96 to transistor 91 through heat sink 31. An increase in thermal feedback due to a rise in the mean temperature of heat sink 31 thereby reduces the output of transistor 91 which in turn reduces the input to power transistor 96. The current through power transistor 96 may therefore be effectively limited to within design limits over a desired operating temperature range.

It is to be emphasized that heat sink 31 provides protection for power transistor 96 by electrically reducing the input thereto. This is in contrast to the operation of conventional heat sinks which provide only a mechanical dissipation of heat to reduce the operating temperature of such transistors. As a result, heat sink 31 may be considerably reduced in a size and weight and is particularly compatible for incorporation in miniaturized devices. Further, such heat sinks may be entirely enclosed by the apparatus housing in that it does not depend upon heat radiation to the open air for efficient operation.

The microphone shown mounted on printed circuit chassis 30 in FIG. 3 is shown in a detached perspective view in FIG. 6. Microphone 31 is of the variable reluctance type for improved sensitivity and distortion characteristics. Microphones of this type are somewhat delicate in nature since they employ a balanced armature and a relatively close air space for variation. Severe shock or vibration may substantially and permanently alter its operating characteristics. And, since the microphone is incorporated in a miniaturized radio device designed to be carried on the person, provisions are desirable to protect microphone if the radio device is inadvertently dropped or subjected to impact of various sorts.

Such a provision encompasses a method of shock mounting microphone 32 on chassis 30. A U-shaped bracket 100 is provided having a base affixed to the bottom of microphone 32 with vertical sides extending downward. A pair of pliant sleeves 101, formed of shock absorption material, such as rubber, are insertable at one end over each of the bracket sides. Mounting lugs 102 are inserted in the other end of sleeves 101 in the manner shown. Lugs 102 may then be attached to chassis 30 by suitable means, such as soldering or the like. Shock or vibration is therefore substantially absorbed by the resilient sleeves 101 to provide the desired protection for microphone 32.

It may thus be seen that a subminiaturized, fully transistorized radio transmitter apparatus is provided in accordance with the present invention as a compact unit which may be carried on the person and operated from a self-contained battery power source. An internal heat sink of reduced size and weight is provided such that the current of a power transistor in the final amplifier stage is effectively held within designed limits over a desired operating temperature range by the control of the input signal thereto. A built-in, miniaturized, variable reluctance microphone is included for improved sensitivity and distortion characteristics having provisions for protection against shock and vibration inherent in portable operation.

I claim:

1. A miniaturized radio transmitter device of the type to be carried on the person and operated from a self-contained battery power source, said transmitter device including in combination, housing means, a printed circuit chassis within said housing means and having electrical circuit components mounted thereon, a subminiature microphone having means for protecting the same against the effects of shock and vibration, said means including a U-shaped bracket having a base affixed to the bottom of said microphone and first and second resilient support arms, each of which being formed by a pliant sleeve of shock absorption material and adapted for receiving a portion of said bracket base in one end thereof and a mounting lug in the other end, said mounting lugs being adapted for attachment to said printed circuit chassis, a final amplifier circuit including a power transistor and a driver transistor for applying signals to said power transistor, and a heat sink affixed to said printed circuit chassis and adapted for receiving said transistors thereon, said heat sink providing thermal feedback from said power transistor to said driver transistor to reduce the output thereof with increasing temperature to control the current in said power transistor within predetermined limits.

2. In a miniaturized radio transmitter device of a type to be carried on the person and operated from a self-contained power source, and wherein such transmitter includes electrical circuit components, a printed circuit chassis for mounting said electrical components thereon, means for housing said printed circuit chassis, a heat sink affixed to said printed circuit chassis, a driver transistor and a power amplifier transistor, means for supporting said transistors on said heat sink, said driver transistor having an output coupled to an input of said power amplifier transistor to provide an input signal thereto, said power amplifier transistor being responsive to an increase in its temperature to increase the current therein and to a decrease in said input signal to decrease the current therein, said driver transistor being responsive to an increase in temperature to decrease said input signal, said heat sink providing thermal feedback from said power amplifier transistor to said driver transistor, said thermal feedback maintaining said driver transistor at substantially the same temperature as said power transistor whereby an increase in temperature of said power amplifier transistor reduces said input signal thereto, thereby maintaining the current therein within predetermined design limits.

3. In a miniaturized radio transmitter device having a plurality of transistorized stages and associated electrical circuit components, a printed circuit chassis for mounting the stages and associated components, means for housing said printed circuit chassis, a final amplifier circuit including a first power transistor and a second driver transistor for applying input signals to said power transistor, said power transistor being responsive to an increase in its temperature to increase the current therein and to a decrease in said input signal to decrease the current therein, said second transistor being responsive to an increase in temperature to decrease said input signal, a heat sink having means for receiving said first and second transistors thereon, said heat sink having a low inductance to provide an efficient radio frequency ground path, and means for isolating said first transistor from electrical contact with said heat sink while permitting efficient transfer of heat energy therebetween, said heat sink providing thermal feedback from said first transistor to said second transistor, said thermal feedback maintaining said second transistor at substantially the same temperature as said first transistor, thereby limiting the current through said first transistor by reducing the output of said second transistor with increasing temperature and thereby the signal input to said first transistor.

4. In a miniaturized radio transmitter device having electrical circuit components and operating from a self-contained power source, a printed circuit chassis for mounting said components, means for housing said printed circuit chassis, a final amplifier circuit including a first transistor having an input and an output and a second transistor having an input and an output, means for coupling said output of said first transistor to said input of said second transistor for applying an input signal thereto, said second transistor being responsive to an increase in its temperature to increase the current therein and to a decrease in said input signal to decrease the current therein, said first transistor being responsive to an increase in temperature to decrease said input signal, an L-shaped plate affixed to said printed circuit chassis and adapted to receive said first and second transistors thereon, said plate having a low inductance to provide an efficient ground path for radio frequency signals, and means for isolating said first transistor from electrical contact with said plate while permitting transfer of heat energy therebetween, said plate thereby providing thermal feedback from said second transistor to said first transistor, said thermal feedback maintaining said first transistor at substantially the same temperature as said second transistor, thereby limiting the current of said second transistor at high temperatures by reducing the output of said first transistor which reduces the input of said second transistor accordingly.

5. A power amplifier circuit including in combination, a first driver transistor and a second power transistor, each of said transistors having an input and an output, means coupling said output of said first transistor to said input of said second transistor for applying an input signal thereto, said second transistor being responsive to an increase in its temperature to increase the current therein and to a decrease in said input signal to decrease the current therein, said first transistor being responsive to an increase in temperature to decrease said input signal, a plate having a relatively low inductance and adapted for mounting said first and second transistors thereon, means for isolating said first transistor from electrical contact with said plate while permitting transfer of heat energy therebetween, said plate providing an efficience ground path for high frequency signals, said plate further providing thermal feedback from said second power transistor to said first driver transistor, said thermal feedback maintaining said first transistor of substantially the same temperature as said second transistor to reduce said input signal to said power transistor with increasing temperature to control the current through said power transistor within desired limits.

6. A miniaturized radio transmitter device of the type to be carried on the person and operative from a self-contained battery power source, said transmitter device including in combination, housing means, a printed circuit chassis within said housing means and having electrical circuit components mounted thereon forming a transmitter circuit, a subminiature microphone connected to the transmitter circuit having mounting means for protecting the same against the effects of shock and vibration, said mounting means including a U-shaped bracket having a base affixed to the bottom of said microphone, first and second resilient support arms and a pair of mounting lugs secured to said printed circuit chassis, each of said support arms being formed by a pliant sleeve of shock absorption material and adapted for receiving a portion of said bracket base in one end thereof and a mounting lug in the other end.

References Cited in the file of this patent

UNITED STATES PATENTS

| | | |
|---|---|---|
| 2,232,380 | Giannini | Feb. 18, 1941 |
| 2,871,376 | Kretzmer | Jan. 27, 1959 |
| 2,964,621 | Foltyn | Dec. 13, 1960 |

OTHER REFERENCES

I. C. Chapel: "Snitcher," Radio-Electronics, November 1959, pp. 35 and 36.